United States Patent [19]
Greene

[11] Patent Number: 6,045,314
[45] Date of Patent: Apr. 4, 2000

[54] RING CARRIER SPEAR FOR ROUND HAY FEEDER

[76] Inventor: David L. Greene, 443 Carpenter Rd., Mooresburg, Tenn. 37811

[21] Appl. No.: 09/263,819

[22] Filed: Mar. 8, 1999

[51] Int. Cl.[7] .............................. A01D 87/00; A01K 1/10
[52] U.S. Cl. .............................. 414/24.5; 119/60
[58] Field of Search .................. 414/24.5, 920; 119/60; 56/228

[56] References Cited

U.S. PATENT DOCUMENTS

| | | | |
|---|---|---|---|
| 3,892,202 | 7/1975 | Feterl | 414/24.5 |
| 3,897,880 | 8/1975 | Waske et al. . | |
| 3,934,726 | 1/1976 | Martin . | |
| 3,995,594 | 12/1976 | Rose | 414/24.5 |
| 4,002,147 | 1/1977 | Feterl | 414/24.5 |
| 4,302,139 | 11/1981 | Malish | 414/24.5 |
| 4,306,825 | 12/1981 | Yilit | 414/24.5 |
| 4,330,231 | 5/1982 | Brewer | 414/24.5 |
| 4,583,900 | 4/1986 | Cooley | 414/24.5 |
| 5,071,311 | 12/1991 | Foster et al. | 414/24.5 |
| 5,094,581 | 3/1992 | Lamb . | |
| 5,129,775 | 7/1992 | Coats et al. | 414/24.5 |
| 5,135,343 | 8/1992 | Wigness . | |
| 5,178,505 | 1/1993 | Smith | 414/24.5 |
| 5,290,133 | 3/1994 | Riley . | |
| 5,476,356 | 12/1995 | Weiss . | |
| 5,584,636 | 12/1996 | Ramsey | 414/24.5 |
| 5,651,653 | 7/1997 | Bablo . | |
| 5,833,424 | 11/1998 | Bales | 414/24.5 |
| 5,868,098 | 2/1999 | Adams | 414/24.5 |

FOREIGN PATENT DOCUMENTS

| 250723 | 9/1962 | Australia . |
|---|---|---|
| 2199012 | 6/1988 | United Kingdom . |

*Primary Examiner*—Douglas Hess
*Attorney, Agent, or Firm*—Richard C. Litman

[57] ABSTRACT

A ring carrier apparatus for a round hay feeder has three spears extending horizontally from an upright post and its perpendicular crossbar base. A single long spear projects from a height on the post, while two widely separated short spears project from the crossbar. A housing is removable and adjustable in height on the upper portion of the post. The housing contains a hook which is opened by a rope leading to the farm tractor hitched to the apparatus. A roll guard on the housing prevents the feeder ring from rotating. A pivoting rocker plate attached to the crossbar base prevents the bottom of the feeder ring from excessive forward movement.

14 Claims, 3 Drawing Sheets

RING CARRIER SPEAR FOR ROUND HAY FEEDER

BACKGROUND OF THE INVENTION

1. Field of the Invention

The present invention relates to a cattle feeder ring carrier with spears for moving a bale and/or the round hay feeder.

2. Description of the Related Art

The present practice of feeding cattle is to take the fresh hay bale out to the feeding ground where the tractor operator must leave the tractor, manually lift the heavy feeder ring and place the ring over the hay bale. Within a few days, there is a need to move the ring because the area becomes muddy and tends to rust the metal ring.

The relevant art of interest describes various hay bale carriers and the like. However, none describes the ring carrier spear for a bale and a round hay feeder. The relevant art of interest will be described in the order of perceived relevance to the present invention.

U.S. Pat. No. 5,094,581 issued on Mar. 10, 1992, to George K. Lamb describes a bale handling apparatus which is attached to a front-end bucket loader of a farm tractor. A grapple with four hooks is coupled with a pair of vertical ribs welded to the rear of the bucket. Other grapple supports connect on each side of the bucket to the lift arm of the tractor. When the bucket is lowered to grasp the hay bale, the grapple swings upward, and when the bucket is raised, the grapple swings down to the bucket containing the hay bale. The apparatus is distinguishable because it is limited to the transformed bucket of a front-end loader tractor.

Australia Patent Application No. 250,723 published on Sep. 27, 1962, for Alan Lehmann describes a silage handling implement which is box shaped with an upper array of movable curved fingers and a fixed lower array of horizontally aligned prongs to spear the silage. The apparatus is attached to the rear of a farm tractor with hydraulic means adjacent the fingers to lower into the pierced silage. The apparatus is distinguishable for its grappling mechanism.

U.S. Pat. No. 5,476,356 issued on Dec. 19, 1995, to Leonard D. Weiss describes a bale handling apparatus for use with the front end of a tractor loader which is capable of handling various types and shapes of loose hay and bales. An upright frame supports a horizontal retainer frame with a row of grapple forks rotatable by a hydraulic cylinder to open and close over a fixed array of horizontal tines on a cross member. The apparatus is distinguishable for its grappling mechanism.

U.S. Pat. No. 3,897,880 issued on Aug. 5, 1975, to Robert J. Waske et al. describes a hay handling apparatus mounted on the flatbed of a pickup truck. An upright L-shaped support member has its short base leg attached to a horizontal bar which pivots in brackets on the rear bumper. The horizontal bar has two extensions which support lances. The vertical long leg is hinged to a pivotal perpendicular rod which has two pivoting lances. A winch releases a cable attached to the pivotal perpendicular rod to extend the upper lances out under a bias by a compression spring, and permits the upright L-shaped support member to pivot out and spear a hay bale with its lower lances and its upper lances to pull back the speared bale into the flatbed with the winch. The mounted apparatus is distinguishable for its jaw-type mechanism to spear a hay bale and load onto a flatbed truck.

U.S. Pat. No. 3,934,726 issued on Jun. 27, 1976, to Leon C. Martin describes a bale carrier mounted on a three-point hitch of a farm tractor. An upright triangular frame has a base tube containing a rotatable pipe with tines perpendicular to it at its free ends. The apex of the frame supports a pair of vertical arms between which another arm with a perpendicular positioned hook is pivoted by a hydraulic cylinder. The hay bale is pierced by the tines and hook, lifted up and carried by the tractor. The carrier apparatus is distinguishable for its clamping structure requiring a separate hydraulic cylinder.

U.S. Pat. No. 5,290,133 issued on Mar. 1, 1994, to Brent W. Riley describes a bale handling apparatus and carriage. The lifting apparatus includes a grapple-like lifting component having an upright rectangular frame, an upper rotatable fork set, and a rotatable bottom fork set with tips. Both sets of forks are movable relative to the frame and to each other by actuation of a hydraulic cylinder. The lifting apparatus is connected to a three-point hitch of a farm tractor. The lifting apparatus is distinguishable for its rotatable doubled fork sets.

U.S. Pat. No. 5,135,343 issued on Aug. 4, 1992, to Myron O. Wigness describes a method and apparatus for handling bales for attachment to the rear of a pickup truck. The main frame is U-shaped with the cross member having a pivoting sleeve supporting a leverage pole with a loop on its end. The main frame is pivotally attached to a mounting base affixed to the bumper. The ends of the U-frame have a floating spear attached by a collar and tether to the U-frame. The main frame is lowered to the bale by a winch attached to the bed of the truck. The spear is thrust through the bale, tethered and rotated up onto the truck by the winch. The apparatus is distinguishable for its boom-like structure.

U.S. Pat. No. 5,651,653 issued on Jul. 29, 1997, to Noel Bablo describes a hayroll handling device comprising a bale spear secured to a hydraulic snowplow headgear mounted on the front end of a truck. The pivoting single spear can be hollow or solid. The device is distinguishable for its single pivoting spear.

U.K. Patent Application No. 2,199,012 published on Jun. 29, 1988, for Raymond Fitzell et al. describes a loader tractor driven apparatus for moving hay bales. The front boom of the tractor has a lower bale support with a bottom roller pivotable on the boom. An upright post has a curved arm with two retaining rollers extending perpendicularly at its end. The arm is raised up by a hydraulic ram, the bale is approached and the bottom roller is pushed under the bale. The boom is lowered to grasp the bale and raised for transport. The apparatus is distinguishable for its single grappling arm with a roller and its bottom roller.

None of the above inventions and patents, taken either singularly or in combination, is seen to describe the instant invention as claimed. Thus, a feeder ring carrier and spear apparatus for a round hay feeder solving the aforementioned problems is desired.

SUMMARY OF THE INVENTION

The present invention is directed to an efficient and economical hay bale feeding ring carrier apparatus for positioning the feeding ring for animals. The area surrounding the feeding ring becomes muddy and messy after a few days in the field resulting in deterioration of the feeder ring. There is a need for moving the hay and ring to another area without manually lifting the ring. Therefore, the feeding ring and the partially depleted hay can be conveniently moved to a different dry location by a tractor with this ring carrier apparatus.

The ring carrier apparatus comprises an upright post equipped with a crossbar opposite two tractor hitch flanges at its bottom. The crossbar supports two short spears and a pivoting rectangular rocker plate. Another longer spear is positioned approximately midway up the post opposite a third tractor hitch flange. The post top has a removable slide housing with a latch for retaining an upper portion of a feeder ring and a hay roll guard and a feeder holding plate to the removable slide housing. A rope controlled by the tractor operator opens up the hook for holding the feeder ring.

Accordingly, it is a principal object of the invention to provide a hay feeder ring carrier with a latch according to the present invention.

It is another object of the invention to provide a hay feeder ring carrier attachable to a three-hitch tractor and the latch manipulable from the tractor.

It is a further object of the invention to provide a hay feeder ring carrier with a pivotable rocking plate protecting its base and the feeding ring while being carried.

Still another object of the invention is to provide a hay feeder ring carrier with a removable slide housing having a feeder ring holding and locking plate and a hay roll guard.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
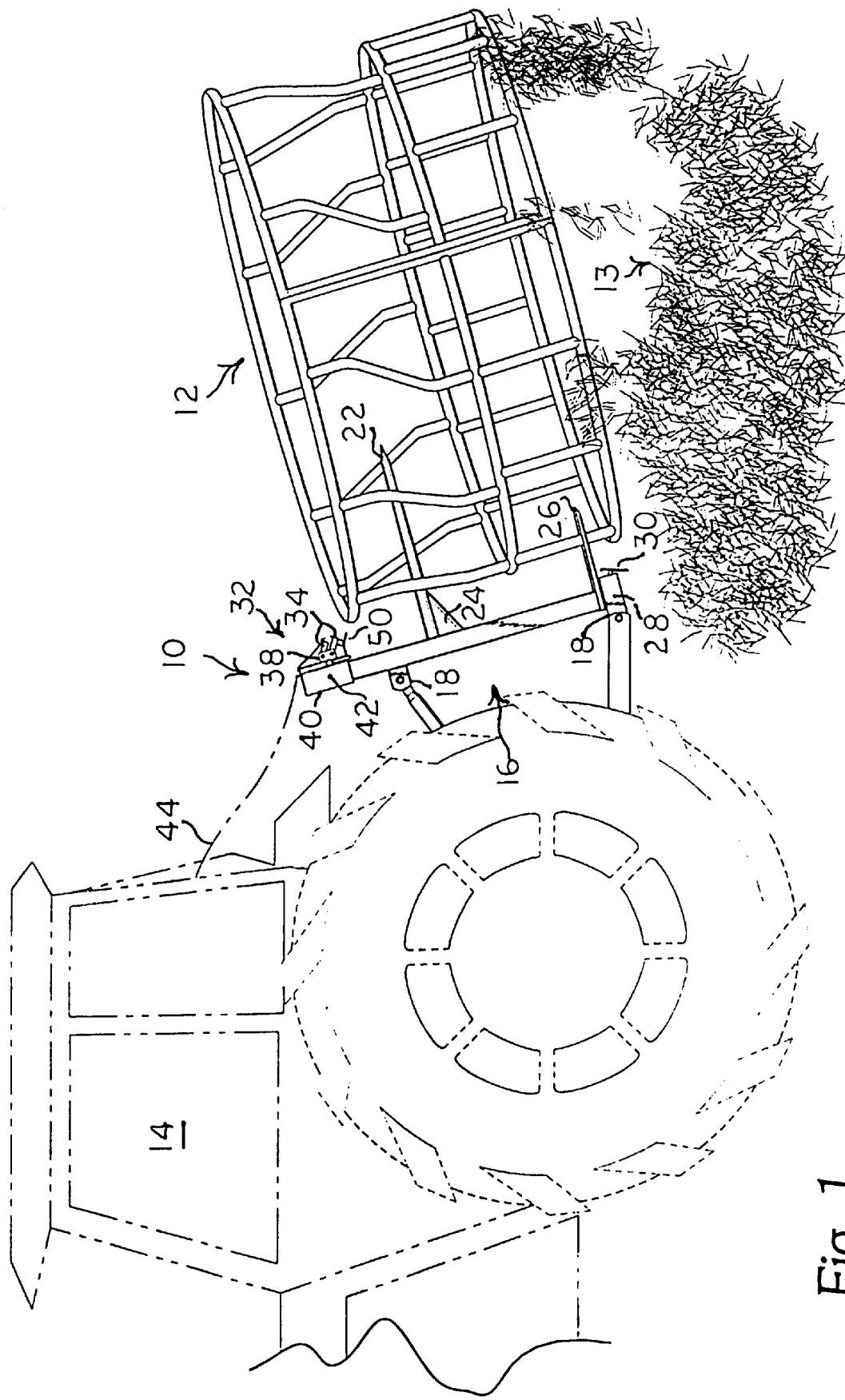
FIG. 1 is an environmental, perspective view of a ring carrier apparatus for a round hay feeder attached to a tractor according to the present invention.

In FIG. 1, the present invention illustrates a ring carrier apparatus 10 for lifting, transporting and depositing a cattle feeder ring 12 with (or without) a hay bundle. A farm tractor 14 (in shadow) with a three-way hitch 16 is hooked up with the hitch flanges 18 on the upright post 20 having a square cross-section. Perpendicular to the vertical axis of the post 20, a long horizontally disposed spear 22 is attached and supported underneath by a triangular gusset 24. A pair of short spears 26 parallel to the long spear 22 are positioned proximate the bottom of the post 22 and rest on an elongated bar base 28 on either side of the post. A pair of hitch flanges 18 are positioned at the ends of the bar base 28. A pivoting rectangular rocker plate 30 is attached to the bar base 28 at its ends for protection of the bar base from encroachment from the bottom portion of the feeder ring 12.

A removable locking mechanism 32 comprising two hook arms 34 in tandem holding a hook 36 are held in a bracket 38 positioned on a slide housing 40 having a square cross-section proximate the top of the post 20 by a set screw fastener 42. A rope 44 for controlling the lifting of the hook 36 from the tractor 14 passes through a guide 46 on top of the post 20 to the hook 36. The hook 36 passes through a slot 48 of a bent (downward) feeder ring holder and locking plate 50. The lower front edge of the holder and locking plate 50 enhances the loading and unloading of the top bar of the feeder ring 12. The locking mechanism 32 is adjustable in height in order to adjust to the height of the top bar of the feeder ring 12.

Figure 2:
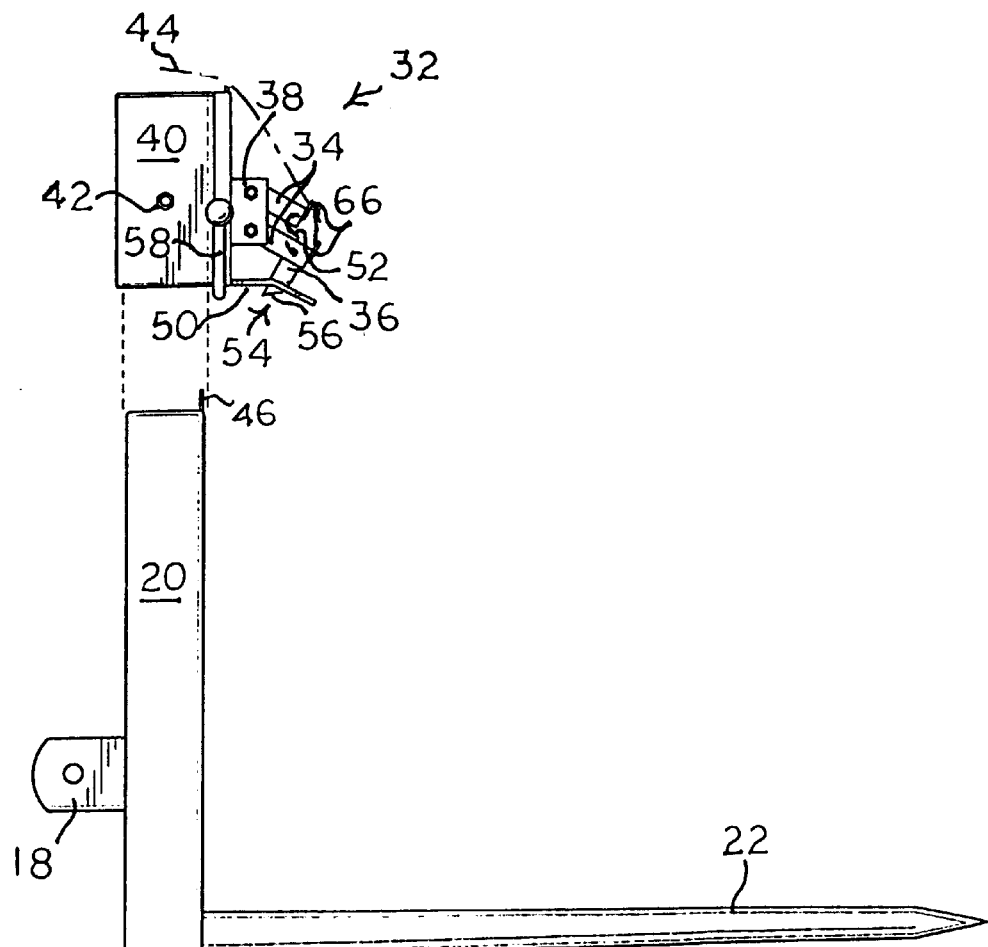
FIG. 2 is a partially exploded side elevational view of the present invention.
Figure 2:
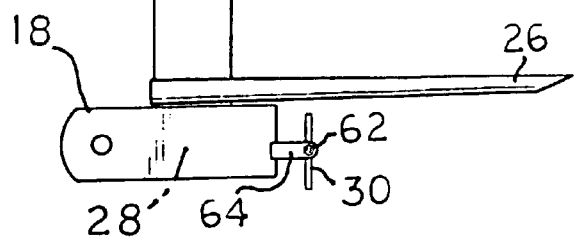
Figure 3:
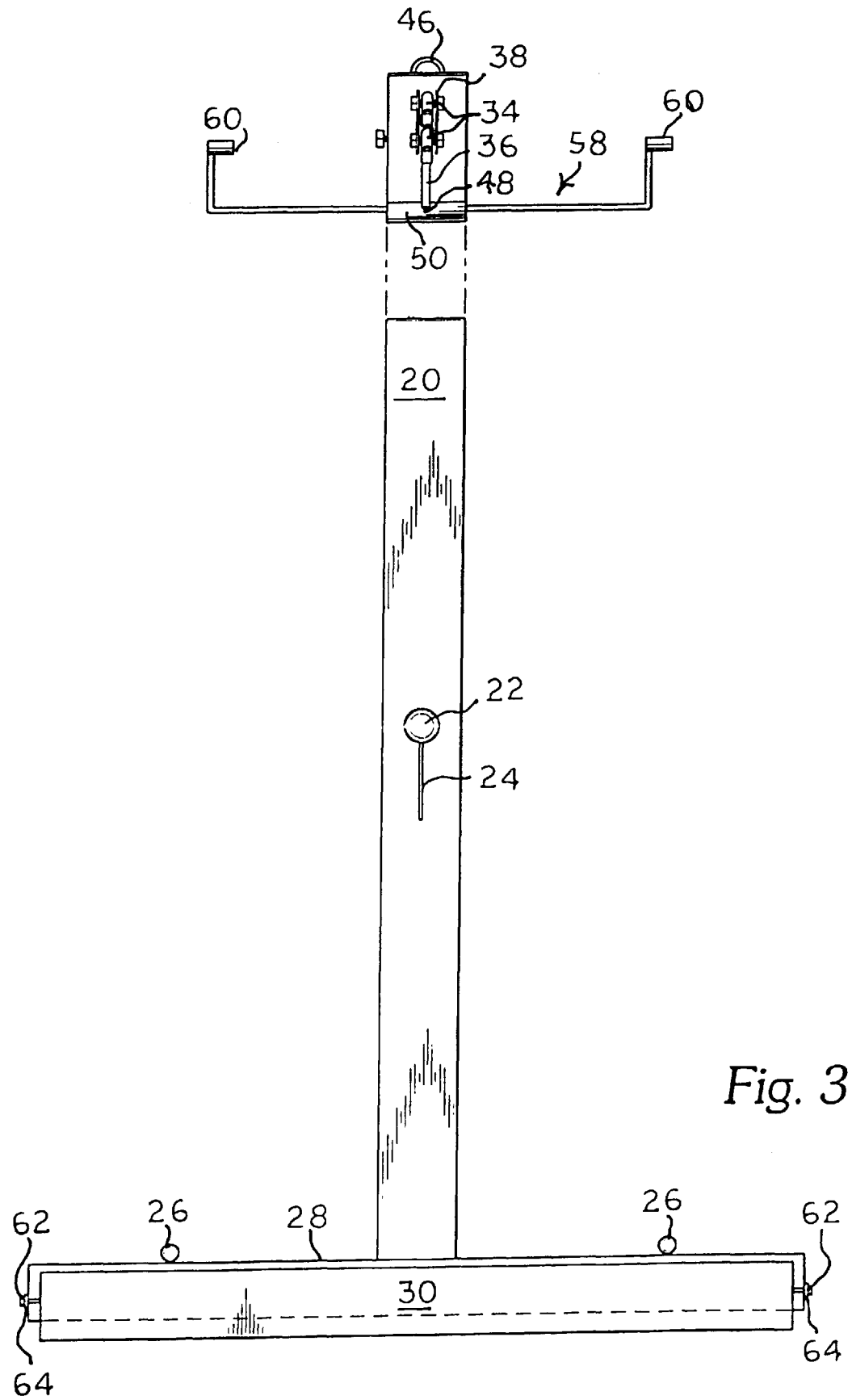
FIG. 3 is a partially exploded front elevational view of the present invention.

The remaining details of the housing 32 are better viewed in FIGS. 2 and 3. A set screw fastener 42 anchors the housing 32 to the post 20. The pair of hook arms 34 are connected together with an S-shaped connector 52 in rings 66 so as to impart a less arcuate arc in order to extract the straight hook 36 from the slot 48 in the feeding ring holder and lock plate 50. The hook end 54 has an inclined edge 56 to enable an accurate entry and exit from the slot 48. A U-shaped hay roll guard 58 comprising a rod with short perpendicular arms 60 are attached at the bottom of the slide housing 40 for preventing the rolling of the feeder ring 12. Three hitch flanges 18 are shown for connection to a tractor.

The long spear 22 with its gusset 24 and the pair of short spears 26 are shown. The pivotable rocker plate 30 is held at its ends by pins 62 in brackets 64.

Thus, a feeder ring holder apparatus has been shown with a novel latching mechanism which permits the tractor operator to stay in his seat to load and unload a feeder ring with or without a hay bale inside. Of course, the apparatus can be utilized to carry hay bales without the feeder ring attached.

It is to be understood that the present invention is not limited to the embodiment described above, but encompasses any and all embodiments within the scope of the following claims.

I claim:

1. A ring carrier apparatus for carrying a round hay feeder with or without a roll of hay by a tractor, the apparatus comprising:

an upright post having a top end, a bottom end, a front side, a rear side, and a rectangular cross-section;

a bar base having a top side and a bottom side being perpendicular to the bottom end of said upright post and attached at its center to form a tee;

a long spear attached perpendicular to said upright post on its rear side and approximately at midpoint of said post;

a pair of short spears attached perpendicular to said bar base on its top side, separated by said upright post, and being parallel to said long spear; and a removable housing having a rectangular cross-section with open top and bottom ends, a front side and a rear side, said housing adapted to slide frictionally on said upright post, said housing comprising:

a hook mechanism on said rear side;

a rectangular feeder holder and lock plate having a downward bend and a slot for engaging the hook mechanism, said slot located below the hook mechanism; and a roll guard element comprising a U-shaped rod with short arms extending rearward at its upper ends and attached below the feeder holder and lock plate;

whereby the ring carrier apparatus can be carried by a tractor for loading, unloading and carrying a hay bundle.

2. The ring carrier apparatus according to claim 1, wherein a rope extends from said hook mechanism to an operator in a cab of the tractor for opening the hook to grasp the feeder ring by its top ring.

3. The ring carrier apparatus according to claim 2, wherein said housing has a ring on its open top for guiding the rope from the hook mechanism to the operator.

4. The ring carrier apparatus according to claim 1, wherein a pivotable rectangular rocking plate commensurate in length to the bar base is positioned behind said bar base for guarding against a bottom portion of said round hay feeder from encroaching under the ring carrier apparatus.

5. The ring carrier apparatus according to claim 4, wherein said rocking plate has pivoting means attached to said bar base.

6. The ring carrier apparatus according to claim 1, further comprising a locking mechanism which includes a bracket having a pair of pivotable hook arms connected by an S-hook to act in concert.

7. The ring carrier apparatus according to claim 6, wherein said pair of pivotable hook arms are connected to a hook element directed downward.

8. The ring carrier apparatus according to claim 7, wherein said hook element penetrates a slot in the feeder holder and lock plate.

9. The ring carrier apparatus according to claim 1, wherein the housing has a fastener for anchoring the housing on said upright post.

10. The ring carrier apparatus according to claim 1, wherein three hitching flanges are provided on the apparatus for attachment to a farm tractor.

11. A housing for a ring carrier apparatus for carrying a round hay feeder, the housing comprising:

The housing having a rectangular cross-section with open top and bottom ends, a front side and a rear side, said housing adapted to slide frictionally on an upright post of a ring carrier apparatus;

a hook mechanism on said rear side;

a rectangular feeder holder and lock plate having a downward bend and a slot for engaging the hook, said slot located below the hook mechanism; and a roll guard element comprising a U-shaped rod with short arms extending rearward at its upper ends and attached below the feeder holder and lock plate;

whereby the housing can lock onto a ring carrier apparatus.

12. The housing for a ring carrier apparatus according to claim 11, further comprising a locking mechanism wherein includes a bracket having a pair of pivotable hook arms connected by an S-hook to act in concert.

13. The housing for a ring carrier apparatus according to claim 12, wherein said pair of pivotable hook arms are connected to a hook element directed downward.

14. The housing for a ring carrier apparatus according to claim 13, wherein said housing has a fastener for anchoring the housing on the ring carrier apparatus.

* * * * *